(12) United States Patent
Parker

(10) Patent No.: US 7,407,898 B2
(45) Date of Patent: Aug. 5, 2008

(54) LIQUID POLYMERIC COATING COMPOSITIONS AND AIR BAGS COATED THEREWITH

(75) Inventor: Richard H. Parker, LaGrange, GA (US)

(73) Assignee: Milliken & Company, Spartanburg, SC (US)

(*) Notice: Subject to any disclaimer, the term of this patent is extended or adjusted under 35 U.S.C. 154(b) by 233 days.

(21) Appl. No.: 11/091,280

(22) Filed: Mar. 28, 2005

(65) Prior Publication Data

US 2006/0217018 A1 Sep. 28, 2006

(51) Int. Cl.
*B32B 5/02* (2006.01)
*B32B 9/04* (2006.01)

(52) U.S. Cl. .................. 442/81; 442/155; 442/157; 428/446; 428/447

(58) Field of Classification Search .............. 442/81, 442/157, 155, 181, 304, 327
See application file for complete search history.

(56) References Cited

U.S. PATENT DOCUMENTS

| | | | | |
|---|---|---|---|---|
| 5,208,097 A | 5/1993 | Honma et al. | ............... | 428/265 |
| 5,421,378 A | 6/1995 | Bowers et al. | ........... | 139/435.1 |
| 5,503,197 A | 4/1996 | Bower et al. | ............ | 139/435.1 |
| 5,658,674 A | 8/1997 | Lorenzetti et al. | ........... | 428/447 |
| 5,700,870 A | 12/1997 | Mueller et al. | ............... | 524/837 |
| 5,753,751 A | 5/1998 | Liao et al. | .................... | 524/837 |
| 5,928,721 A | 7/1999 | Parker et al. | ................. | 427/197 |
| 6,037,279 A | 3/2000 | Brookman et al. | ............ | 442/71 |
| 6,200,915 B1 | 3/2001 | Adams et al. | ................ | 442/157 |
| 6,268,300 B1 | 7/2001 | Hernandez et al. | .......... | 442/168 |
| 6,342,280 B1 | 1/2002 | Patrick et al. | .............. | 428/34.6 |
| 6,348,543 B1 | 2/2002 | Parker | ........................ | 525/106 |
| 6,354,620 B1 | 3/2002 | Budden et al. | ........... | 280/728.1 |
| 6,468,929 B2 | 10/2002 | Parker | ........................ | 442/164 |
| 6,534,126 B1 | 3/2003 | Blackwood et al. | ...... | 427/407.1 |
| 6,545,092 B2 | 4/2003 | Parker | ........................ | 525/106 |
| 6,562,737 B1 | 5/2003 | Bohin et al. | .................. | 442/59 |
| 6,569,788 B1 | 5/2003 | Hurst et al. | ................. | 442/168 |
| 6,709,752 B1 | 3/2004 | James et al. | ................ | 428/447 |
| 6,734,124 B2 | 5/2004 | Hurst et al. | ................. | 442/168 |
| 6,846,004 B2 | 1/2005 | Parker | ..................... | 280/728.1 |
| 6,908,528 B2 | 6/2005 | Hayes | ..................... | 156/307.1 |
| 2002/0020992 A1 | 2/2002 | Kanuma | .................. | 280/730.2 |
| 2002/0122908 A1* | 9/2002 | Li et al. | ..................... | 428/36.2 |
| 2004/0058601 A1* | 3/2004 | Parker | ........................ | 442/76 |
| 2004/0209089 A1 | 10/2004 | Liu et al. | | |
| 2004/0222618 A1* | 11/2004 | Azechi et al. | ............ | 280/728.1 |

FOREIGN PATENT DOCUMENTS

| | | |
|---|---|---|
| EP | 1013817 A2 | 6/2000 |
| EP | 1108764 A2 | 6/2001 |
| EP | 1505132 A2 | 2/2005 |
| EP | 1529823 A1 | 5/2005 |
| WO | WO 00/78543 A1 | 12/2000 |
| WO | WO 2004/029344 A2 | 4/2004 |

\* cited by examiner

*Primary Examiner*—Lynda Salvatore
(74) *Attorney, Agent, or Firm*—John E. Vick, Jr.

(57) ABSTRACT

A coating composition for air bag fabrics is disclosed, the composition being comprised of liquid silicone rubbers and liquid organic polymers that are chemically reacted to form cross-linked polymer networks with silicone and non-silicone components. By adding liquid organic polymers to liquid silicone rubber compounds as described herein, coatings for air bags that show increased retention of the inflating air have been discovered. Beneficially, the production of these coatings is achieved without the use of organic solvents. An air bag coated with the present formulation is also disclosed.

11 Claims, 2 Drawing Sheets

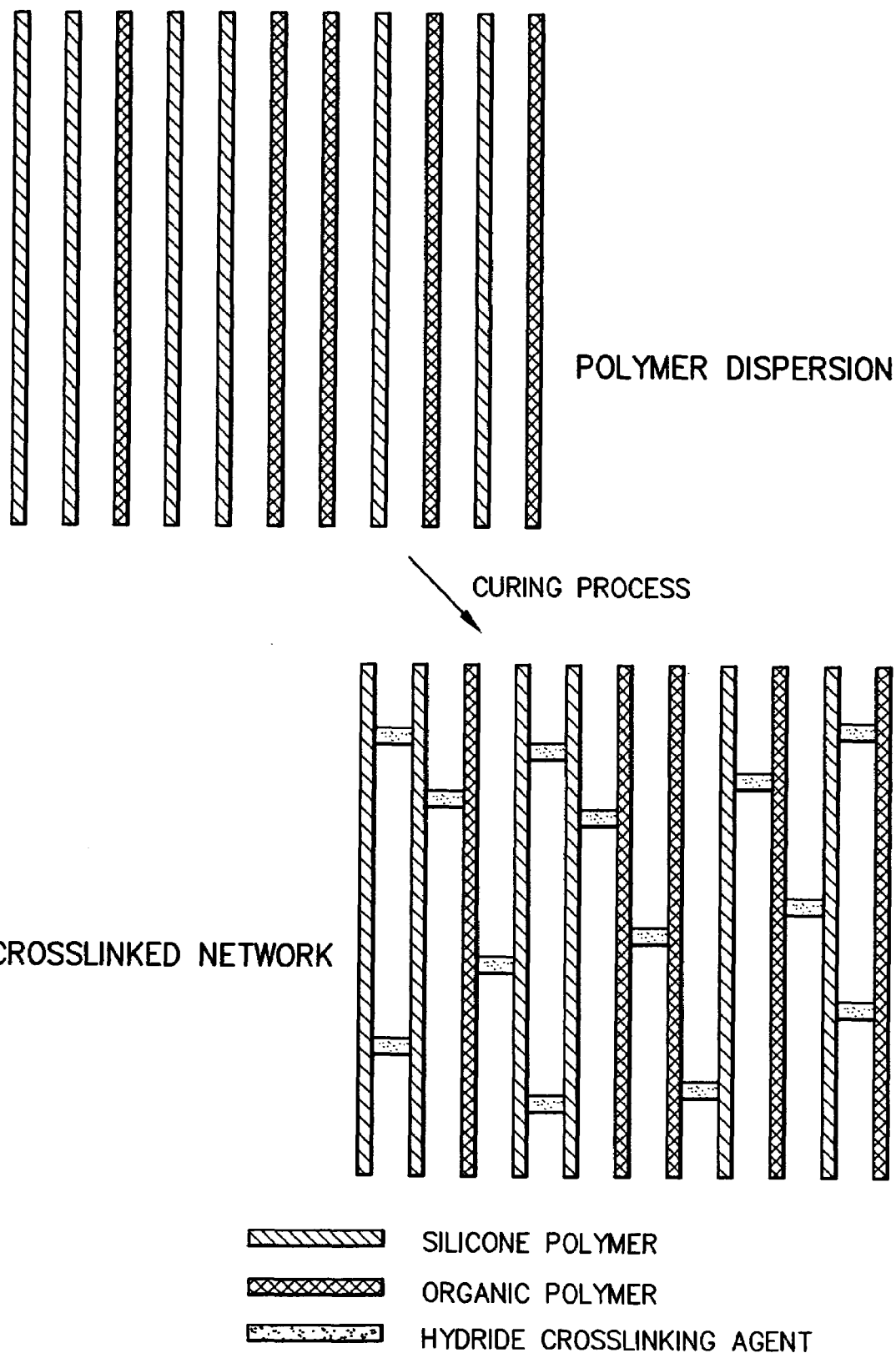
FIG. -1-

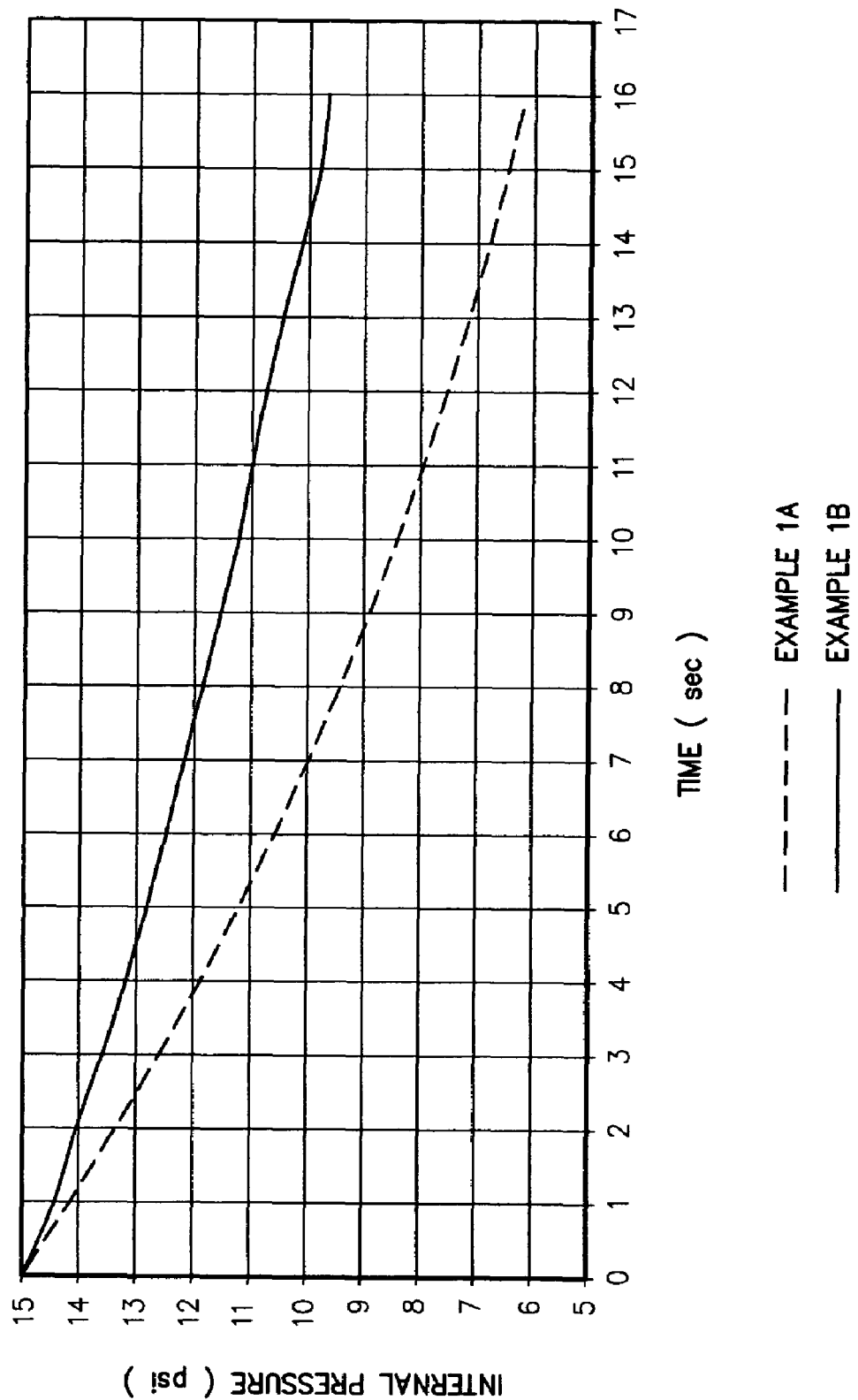
FIG. -2-

LIQUID POLYMERIC COATING COMPOSITIONS AND AIR BAGS COATED THEREWITH

TECHNICAL FIELD

The present disclosure relates to a textile coating composition containing a cross-linked blend of liquid silicone rubber and a liquid organic polymer. The coating composition is produced without the need for organic solvents, resulting in a safer, less expensive, and more environmentally friendly material. The coating composition, which results in the creation of a cross-linked polymer network made from relatively low molecular weight components, is well-suited for use on air bag fabrics and particularly well-suited for use on air bag fabrics used to manufacture side-curtain-type air bags, where low air permeability is desired.

BACKGROUND

Air bags have evolved over the past few decades from driver's side air bags containing two roughly symmetrical (usually circular) bag panels to more complicated passenger side and side curtain air bags having unique geometries and configurations. Side curtain air bags generally are deployed from packing containers positioned within the roofline along the side windows of a vehicle. These side curtain bags, which are designed to protect passengers during rollover crashes by retaining the inflation state for a long duration, should not only provide cushioning effects, but also provide protection from broken glass and other debris. Therefore, it is imperative that side curtain air bags retain large amounts of gas (at high gas pressures) to remain inflated throughout the potentially long time periods associated with a rollover occurrence.

It has been found that efficient side-curtain air bags may be produced as one-piece woven (preferably Jacquard woven) articles. A one-piece Jacquard air bag cushion is more economical to produce due to the elimination of cutting and sewing steps typically associated with production of multi-panel air bags. The distinct disadvantage of this system is that the target bag must be coated on the outside during production. Whereas traditional driver-side bags included coatings on the interior of the bag components, these one-piece woven structures necessitate coatings on the exterior of the bag component (that is, coating the interior of the finished bag is not possible).

Coatings have typically been applied to fabrics for automotive air bags to resist the unwanted permeation of air through the fabric and, to a lesser extent, to protect the fabric from the hot gases used to inflate the bags. A variety of materials have been used to create these fabric coatings, ranging from early efforts in which polychloroprene was the material of choice to later efforts in which silicone or silicone-containing materials were preferred. Efforts, in which silicone polymer blends are used as air bag coatings, are described, for example, in U.S. Pat. Nos. 6,348,543; 6,468,929; and 6,545,092.

In the case of one-piece, side curtain-type air bags, having a highly functional coating is especially important. Unlike driver-side bags, coated on the interior, where excursion of the bag tends to press the coating against the fabric surface, in one-piece bags, coated on the exterior, the coating is actually pushed away from the fabric surface during deployment. This force has the potential to cause two significant problems—rupture of the coating and delamination of the coating from the bag panel—that may lead to the failure of the bag as a whole. The present disclosure provides a coating composition that overcomes these issues in effective manner that is both economically feasible and environmentally friendly.

Although silicone polymers alone have a number of shortcomings (e.g., relatively high air permeability, relatively high cost, and tendency to cause yarn shifting due to its lubricating properties), it has been found that one can modify the behavior of silicone polymers by forming what are called "interpenetrating polymer networks" (IPNs). IPNs are a special class of polymer blends in which the polymers exist in networks that are formed when the polymer components are thermodynamically compatible to a point at which they dissolve, or are essentially microscopically dispersed, in each other. Classical, or true, IPNs occur when all of the polymer species within a blend form chemical cross-links.

In previous attempts to produce IPNs, the components have been dissolved in a common solvent and, ultimately in each other (i.e., a polymer is dissolved with silicone in a solvent). Toluene is one example of such a solvent. While functional coatings have been developed in this manner, manufacturers of air bag fabrics have sought to replace solvent-based formulations with other systems that are less expensive, safer, and more environmentally friendly. The present disclosure addresses these manufacturer needs by replacing the solvent-dissolved polymeric solids of previous attempts with a polymer blend comprised of liquid silicone rubbers and liquid copolymers.

SUMMARY

A coating composition for air bag fabrics is disclosed, the composition being comprised of liquid silicone rubbers and liquid organic polymers that are chemically cross-linked to form a series of polymer networks with silicone and non-silicone components. By adding liquid organic polymers to liquid silicone rubber compounds as described herein, the engineering properties of the composition are more amenable to its performance as an air bag coating than those of the liquid silicone rubber alone and the need for solvents is eliminated. An air bag coated with the present formulation is also disclosed.

BRIEF DESCRIPTION OF THE DRAWINGS

FIG. 1 is a schematic representation of the mechanism for formation of an interpenetrating polymer network created by the addition of liquid organic polymers to a liquid silicone rubber; and FIG. 2 is a line graph showing the air retention rates of air bags coated with various coating compositions of the present disclosure.

DETAILED DESCRIPTION

As defined herein, the term "liquid silicone rubber" means one of a number of silicone compounds, each being characterized by being liquid at room temperature. Examples of such compounds have been described in the literature, using terms such as polysiloxane, polydimethylsiloxane, polysiloxane with a polyalkyl-functionality, and polysiloxane with vinyl functionality. One such example (among many) of a liquid silicone rubber contemplated for use herein is a polydimethylsiloxane product, obtained from Shin-Etsu Chemical Co.

Preferably, the liquid silicone rubber is a compounded silicone polymer that comprises a "vinyl"-containing polysiloxane, a platinum catalyst, and a liquid organohydrogenpolysiloxane cross-linking agent. The term "vinyl" refers to a silicon-vinyl group (Si—CH=CH$_2$). The cross-linking agent contains a "hydride", that is a polymer chain terminated with a hydridosilane (Si—H) group. The reaction that creates the polymer network occurs between (a) the vinyl and hydride groups of the silicone polymer and (b) the hydride groups of the silicone polymer and the carbon-carbon double bonds of the organic polymer.

As defined herein, the term "liquid organic polymer" means one of a number of organic compounds, each being characterized by at least one unsaturated carbon-carbon double bond (—C=C—) and by being liquid at room temperature. Such compounds may react with liquid silicone rubber by participating in the reaction between the unsaturated sites on the silicone and the "hydride" (SiH) cross-linking agent, with the reaction preferably being catalyzed by noble metals, such as platinum, present in the compounded silicone polymer.

The molecular weight distribution of the liquid organic polymer compounds affects the ease with which it may be incorporated with the liquid silicone rubber to form a polymer network. Organic materials, consisting of polymers with a distribution of high molecular weights, tend to be more viscous and ultimately can be solids. This makes them increasingly more difficult to disperse in other materials without the aid of a solvent. This property of high viscosity also negatively affects the ability of the blended material to be coated using traditional methods, such as knife coating. Conversely, if the organic material consists of a distribution of low molecular weight polymers, the engineering properties (tensile strength, tear strength, etc.) of the resulting cured coating may be so negatively affected as to make the material unsuitable for its intended use as an air bag coating.

Examples of liquid organic polymers, meeting the desired criteria for use herein, include liquid forms of polyisoprene (including cis 1-4-polyisoprene), butyl rubber, and ethylene-propylene-diene monomer (EPDM) rubber. In one preferred embodiment, the liquid organic polymer is a polyisoprene.

The ratio of liquid organic polymer to liquid silicone rubber is a determinant of whether the polymer network will perform as intended, that is, by providing sufficient, adhesion, strength and flexibility to the coating to prevent it from rupturing or delaminating.

It has been found that the optimal level of the liquid organic polymer present in the coating should be in an amount between 2% and 20% of the total polymer network (with the liquid silicone rubber compound comprising the remainder). More preferably, the liquid organic polymer is present in an amount between 5% and 12% of the total polymer network and, most preferably, in an amount of about 5% of the total polymer network.

The liquid organic polymer can be mechanically admixed into the liquid silicone polymer, without the need for heat. Mixing can be done effectively with either a single or double planetary mixer or other mixing devices as are known in the art. Preferably, it is desirable to minimize the air incorporated into the coating dispersion. The length of time required to mix the components is dependent on the amount of components being mixed, as well as the type and efficiency of the mixing device. A representative time for a Kitchen Aid®-brand planetary mixer, to mix a batch size of approximately 2,000 grams, is about five minutes. Obviously, larger batch sizes would be more efficiently mixed using a larger mixing device and vessel, perhaps accompanied by longer mixing times.

When mixed, the organic polymer is interdispersed into the silicone polymer. Once the silicone polymer and the organic polymer have been effectively interdispersed, the next step involves a cross-linking reaction in which the silicone polymer cross-links to itself and to the organic polymer. The reaction is induced by a catalyst, such as platinum, in the presence of heat (i.e., the "curing" process).

FIG. 1 shows a schematic representation of liquid silicone polymer (indicated with diagonal lines) and a liquid organic polymer (indicated with cross-hatching) in dispersion form and after the curing process. After curing, a cross-linked network is achieved, in which the silicone polymers are cross-linked to one another and to the organic polymer, via hydride cross-linking agents. The resulting cross-linked polymer network is shown in the lower portion of FIG. 1.

Cross-linking is believed to occur between the hydride and vinyl-functional groups of the silicone polymer, as well as between the hydride groups of the silicone polymer and carbon-carbon double bond sites of the organic polymer. When the cross-linking reaction is complete, the organic polymer becomes part of the silicone polymer network and, as a result, imparts additional properties included in the organic polymer (but not inherent in the silicone) to the resulting polymer network.

In summary, the process of forming a cross-linked polymer network comprises the steps of: (a) providing a compounded silicone polymer, as described herein, containing a "vinyl"-containing polysiloxane, a platinum catalyst, and a liquid organohydrogenpolysiloxane cross-linking agent; (b) combining the compounded silicone polymer with a liquid organic polymer having at least one unsaturated carbon-carbon double bond to create a polymer dispersion; (c) applying the polymer dispersion to an air bag or air bag fabric; and (d) reacting the polymer dispersion with heat, in the presence of that catalyst, to form a cross-linked polymer network.

The present coating composition and air bag is further described in EXAMPLE 1, as follows.

EXAMPLE 1

Lab-scale air bags that have been used within the industry as models for full-scale air bags were used for these examples. The one-piece woven air bags were each coated with a formulation selected from the list below. During the coating process, the coated air bags were exposed to a temperature of 150° C. for two minutes, and the coated air bags were subsequently post-cured in a lab oven at 170° C. for two minutes.

Example 1A (Comparative)

Liquid silicone rubber, commercially available from Shin-Etsu and sold under the designation "X-34-1766-8", activated by combining the "A" and "B" components of the silicone composition.

Example 1B 50 parts (by weight) of the "A" component of X-34-1766-8 and 20 parts (by weight) of cis-1,4-polyisoprene (commercially available from Elementis Specialties under the tradename "ISOLENE 400") combined with 50 parts (by weight) of the "B" component of X-34-1766-8.

The bags were inflated to 15 p.s.i. and sealed. The internal pressure was monitored over time, and the results are shown in line-graph form in FIG. 2.

Typically, in the air bag industry, the residual bag pressure is reported at a time of twelve seconds after inflation. The Example 1A bag, which was coated only with liquid silicone rubber, exhibited a residual pressure of only about 7.75 p.s.i., or about 51% of its original inflation pressure. The Example 1B bag, which contained liquid organic polymers combined with the liquid silicone rubber, exhibited a residual bag pressure of about 10.8 p.s.i., or about 72% of the original inflation pressure.

Thus, the Example 1B bag coated with the present composition was less permeable to the inflating air than the bag coated with liquid silicone alone, representing a significant advantage when used for side curtain air bags, where air retention is especially important in maintaining a protective environment (e.g., in cases of roll-over crashes).

The coating of the present invention may also contain certain silane coupling agents to improve the adhesion of silicone containing coatings to fabrics (such as trimethoxyorganosilanes, triethoxyorganosilanes, mixtures thereof, and the like). Such additives have been found to significantly increase adhesion for the present coatings on target one-piece woven air bag cushions to prevent the unsightly blistering (aneurysms) that may occur in certain cushions upon inflation.

Various additives may also be incorporated into the present coating composition, including pigments or dyes (to enhance aesthetics or for identification purposes), flame retardants, inert ingredients (such as calcium carbonate or other filler materials), and processing aids which may be necessary to process the composition and make it suitable for use as an air bag coating.

In one embodiment, the coating of the present invention is used in combination with any type of fabric substrate or assembled air bag. Depending on the end use of the fabric substrate, the particular silicone polymer blend and the particular type of fabric substrate combined can vary. Such fabric substrates can be formed from natural fibers, such as cotton, ramie, abaca, wool and the like; synthetic fibers, such as polyester, polyamide, regenerated cellulose, and the like; and inorganic fibers, such as glass, boron derivative fibers, and the like. Furthermore, the target fabrics may be woven, knitted, non-woven, and the like. Most preferably, the air bag substrate of the present disclosure is a Jacquard or Dobby woven one-piece air bag cushion.

Any standard low permeability air bag fabric construction may be utilized as the target air bag fabric with the present coating composition. Although the present coating composition has been described for use with side curtain air bags, it should be understood that the coating composition may be equally well suited for use with other air bag configurations (e.g., driver-side or passenger-side air bags). Additionally, while the present coating is described for use with pre-formed air bag cushions, it should be understood that the present coating is equally useful for use on air bag base fabrics from which air bag panels may be subsequently cut.

Preferably, however, as noted above, the target fabric substrate is a Jacquard or Dobby woven cushion, formed from yarns of synthetic fibers, such as polyesters and polyamides. Such yarn preferably has a linear density of about 210 denier to about 630 denier. Such yarns are preferably formed from multiple filaments, wherein the filaments have linear densities of about 6 denier per filament or less. The fabric substrate with applied coating will hereinafter be referred to as "an air bag base fabric."

In another embodiment of the present invention, upon dispersing the components of the present coating, the formulation is preferably scrape-coated across the air bag base fabric and the resultant coated air bag base fabric is then cured in an oven at between 150° C. and 200° C. to cross-link the polymer constituents and to ultimately form a thin coating. Scrape coating, as used herein, includes, and is not limited to, knife coating (such as knife over roll, knife over gap, knife over table, floating knife, and knife-over-foam pad methods). Because the coating composition exhibits excellent adhesive properties, generally only one coating pass is necessary to provide an effective, stable, low permeability coating on the target fabric substrate.

The final dry weight of the coating may vary with the intended use. For fabrics in which prolonged retention of the inflating air is not as critical (such as certain non-rollover side curtains, driver's side and passenger air bag cushions), the add-on may be one ounce per square yard. For fabrics in which the extended retention of the inflating air is required, especially in the case of Jacquard or Dobby woven air bags intended for side curtain use, the add-on (preferred) would be between about 1.0 and about 3.0 ounces per square yard, depending on the design of the bag.

As previously indicated, the substrate fabric is preferably a woven polyamide material such as nylon. In the most preferred embodiment, such substrate fabric will be formed from fibers of nylon 6,6. It has been found that such polyamide materials exhibit particularly good adhesion when used in combination with the coating according to the present invention.

The use of the present coating composition is beneficial in achieving a cross-linked polymer network without the need for solvents, resulting in a safer, more economical, and more environmentally friendly material.

I claim:

1. A fabric substrate, at least a portion of said fabric substrate being coated with a coating formulation comprising a solvent-free reaction product of (a) at least one liquid organic polymer having unsaturated C=C bonds, said organic polymer being selected from the group consisting of polyisoprene, cis 1,4-polyisoprene, butyl rubber, and EPDM, and (b) a compounded liquid silicone polymer, said compounded liquid silicone polymer comprising a vinyl-containing polysiloxane, a catalyst, and a liquid organohydrogenpolysiloxane cross-linking agent.

2. A fabric substrate as recited in claim 1, wherein said fabric substrate is woven.

3. The fabric substrate of claim 2, wherein said fabric substrate is a Jacquard woven.

4. The fabric substrate of claim 1, wherein said fabric substrate is knitted.

5. The fabric substrate of claim 1, wherein said fabric substrate is non-woven.

6. The fabric substrate of claim 1, wherein said fabric substrate is comprised of fibers selected from the group consisting of natural fibers, synthetic fibers, and inorganic fibers.

7. The fabric substrate of claim 1, wherein said coated fabric substrate is used as an automotive air bag.

8. An automotive air bag, said air bag comprising a fabric substrate, wherein at least a portion of said fabric substrate is coated with a solvent-free coating formulation comprising a reaction product of (a) at least one liquid organic polymer having unsaturated C=C bonds, said organic polymer being selected from the group consisting of polyisoprene, cis 1,4-polyisoprene, butyl rubber, and EPDM, and (b) a compounded liquid silicone polymer, said compounded silicone polymer comprising a vinyl-containing polysiloxane, a catalyst, and a liquid organohydrogenpolysiloxane cross-linking agent.

9. The air bag of claim 8, wherein said air bag comprises a one-piece Jacquard woven cushion.

10. The air bag of claim 8, wherein said air bag comprises a one-piece Dobby woven cushion.

11. The air bag of claim 8, wherein said air bag exhibits an inflation retention level, when measured about twelve seconds after inflation, of at least 70% of its original inflation pressure.

* * * * *